US010645825B1

(12) United States Patent
Hurt et al.

(10) Patent No.: US 10,645,825 B1
(45) Date of Patent: May 5, 2020

(54) TAMPER-RESISTANT ELECTRONICS SYSTEM AND IMPROVED METHOD OF MANUFACTURING THEREFOR

(71) Applicant: The Crestridge Group, Parker, CO (US)

(72) Inventors: Steven F Hurt, Parker, CO (US); Cynthia Hurt, Parker, CO (US)

(*) Notice: Subject to any disclaimer, the term of this patent is extended or adjusted under 35 U.S.C. 154(b) by 0 days.

(21) Appl. No.: 16/200,428

(22) Filed: Nov. 26, 2018

Related U.S. Application Data

(60) Provisional application No. 62/591,164, filed on Nov. 27, 2017.

(51) Int. Cl.
| G08B 13/00 | (2006.01) |
| H05K 5/02 | (2006.01) |
| H05K 7/20 | (2006.01) |
| H01Q 1/02 | (2006.01) |
| G08B 13/02 | (2006.01) |
| H01Q 1/24 | (2006.01) |

(52) U.S. Cl.
CPC .......... H05K 5/0208 (2013.01); G08B 13/02 (2013.01); H01Q 1/02 (2013.01); H01Q 1/24 (2013.01); H05K 5/0247 (2013.01); H05K 7/20436 (2013.01)

(58) Field of Classification Search
CPC .. H05K 5/0208; H05K 1/0275; H05K 5/0217; H05K 5/0247; H01Q 1/30; B08B 13/00; G08B 13/12
See application file for complete search history.

(56) References Cited

U.S. PATENT DOCUMENTS

| 4,887,180 | A | 12/1989 | Climent et al. |
| 5,832,206 | A | 11/1998 | Jesus et al. |
| 5,832,214 | A * | 11/1998 | Kikinis ................ G06F 21/575 726/19 |
| 6,512,454 | B2 | 1/2003 | Miglioli et al. |
| 9,408,314 | B2 | 8/2016 | Vasoya |
| 9,460,828 | B2 | 10/2016 | Wu et al. |
| 9,554,477 | B1 * | 1/2017 | Brodsky .............. H05K 5/0208 |

(Continued)

FOREIGN PATENT DOCUMENTS

| EP | 2899820 A1 | 7/2015 |
| JP | 6190735 B2 | 8/2017 |

(Continued)

OTHER PUBLICATIONS

PCT/US18/062492—Invitation to Pay Additional Fees—Jan. 4, 2019.

*Primary Examiner* — Toan N Pham
(74) *Attorney, Agent, or Firm* — Holzer Patel Drennan

(57) ABSTRACT

In accordance with the embodiments described herein, there is provided an enclosure system including an enclosure formed of an insulating material, and at least one heatsink arrangement formed of a thermally-conductive material. The heatsink arrangement includes at heat conductive surface configured as one of a pyramid, an inverted pyramid, a plateau, a spherical segment, and an inverted spherical segment. The heatsink arrangement in the enclosure system can be integrally formed from the enclosure such that a demarcation between the heatsink arrangement and the enclosure is water-tight. The enclosure and the heatsink arrangement can also be simultaneously integrally formed and enmeshed using additive manufacturing processes.

3 Claims, 13 Drawing Sheets

(56) References Cited

U.S. PATENT DOCUMENTS

| | | |
|---|---|---|
| 2002/0053991 A1 | 5/2002 | Lindell |
| 2006/0049941 A1 | 3/2006 | Hunter et al. |
| 2008/0258991 A1 | 10/2008 | Montgomery et al. |
| 2010/0085713 A1 | 4/2010 | Balandin et al. |
| 2010/0259935 A1 | 10/2010 | Scordino et al. |
| 2010/0331734 A1 | 12/2010 | Stein |
| 2013/0271920 A1 | 10/2013 | Chun et al. |
| 2013/0294041 A1 | 11/2013 | Syal |
| 2015/0207254 A1 | 7/2015 | Kamei et al. |
| 2016/0069622 A1 | 3/2016 | Alexiou et al. |
| 2017/0094847 A1 | 3/2017 | Fisher et al. |
| 2017/0156223 A1 | 6/2017 | Fisher et al. |

FOREIGN PATENT DOCUMENTS

| | | |
|---|---|---|
| WO | 2002089538 A2 | 11/2002 |
| WO | 2013163761 A1 | 11/2013 |

\* cited by examiner

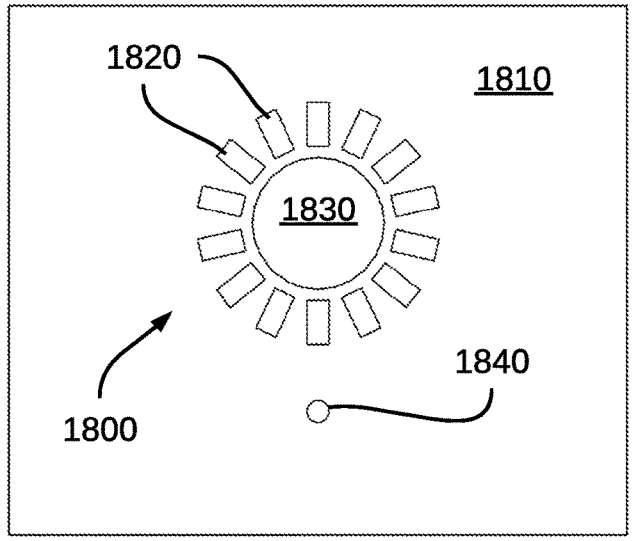
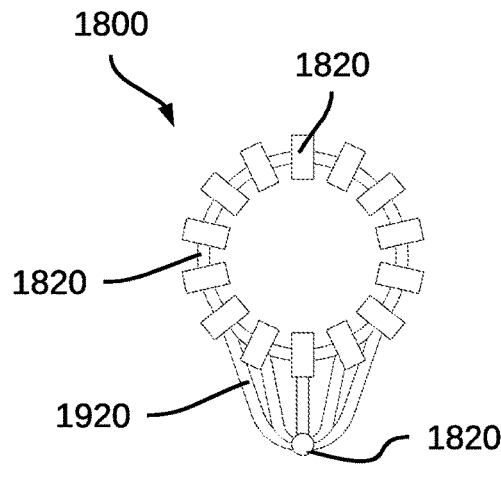
FIG. 18
FIG. 19
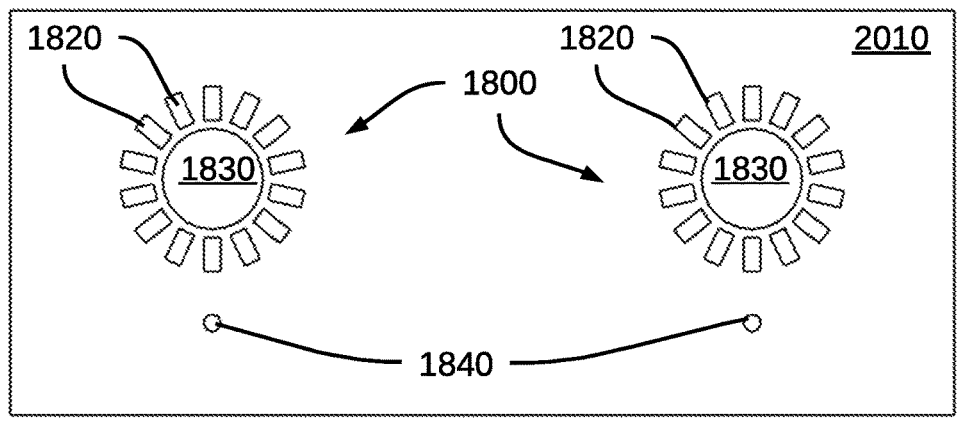
FIG. 20
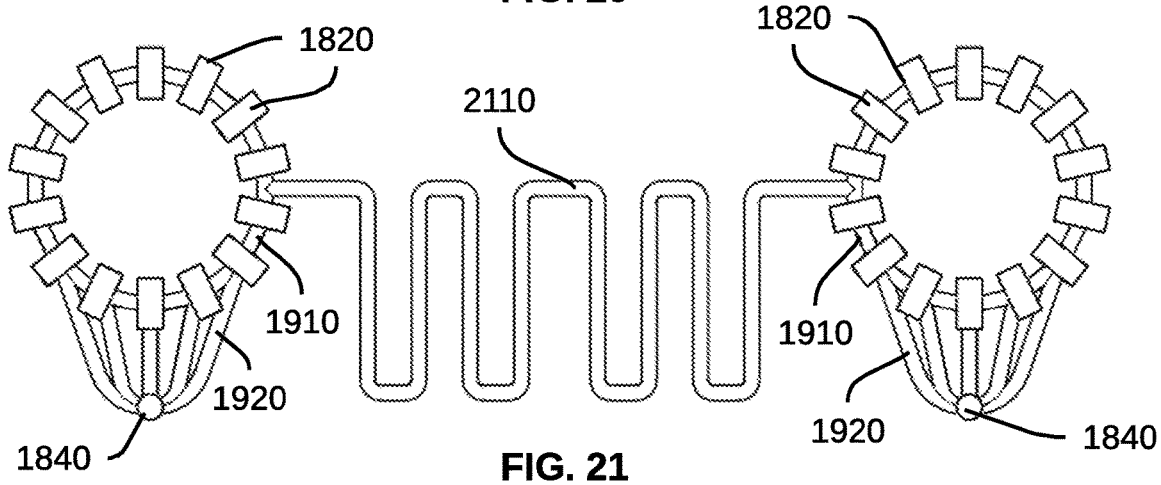
FIG. 21

TAMPER-RESISTANT ELECTRONICS SYSTEM AND IMPROVED METHOD OF MANUFACTURING THEREFOR

CROSS-REFERENCE TO RELATED APPLICATIONS

The present application claims benefit of priority to U.S. Provisional Patent Application No. 62/591,164, entitled "Tamper-Resistant Electronics System and Improved Method of Manufacturing Therefor" and filed on Nov. 27, 2017, which is specifically incorporated by reference for all that it discloses and teaches.

FIELD OF THE INVENTION

The present invention relates to secure electronic systems and, more particularly, to electronic systems with tamper-resistance and tamper-detection features.

BACKGROUND OF THE INVENTION

Protection of electronic systems against physical attackers is an important aspect of security and military systems. For example, bank ATM machines require tamper-resistant and/or tamper-detection features to protect their electronic components from being accessed by intruders. In such machines, the electronic components are protected by, for instance, features that detect unauthorized attempts to remove access panels or to penetrate the enclosure by drilling a whole through the enclosure. Penetrations may be used to insert RF probes into the enclosure to identify vulnerabilities or perform side channel attacks.

While a variety of technologies exist for tamper-resistance and tamper-detection for use with secure systems, attackers continue to find new ways to thwart such protective features.

Additionally, many such secure electronic systems require the ability to communicate wirelessly with other electronic systems. That means antennas and counterpoise planes need to be incorporated into these electronic systems, further complicating their designs and manufacturing processes.

SUMMARY OF THE INVENTION

In accordance with the embodiments described herein, there is provided an enclosure system including an enclosure formed of an insulating material, and at least one heatsink arrangement formed of a thermally-conductive material. The heatsink arrangement includes at heat conductive surface configured as one of a pyramid, an inverted pyramid, a plateau, a spherical segment, and an inverted spherical segment.

In an embodiment, the heatsink arrangement in the enclosure system is integrally formed from the enclosure such that a demarcation between the heatsink arrangement and the enclosure is water-tight. In an alternative embodiment, the enclosure and the heatsink arrangement are simultaneously integrally formed and enmeshed using additive manufacturing processes.

In accordance with another embodiment, a system with tamper-resistance features for securing containing components therein. The system includes an outer enclosure, integrally formed from a conductive material and an insulating material, and a sensing circuit connected with the conductive material. The system also includes an alert circuit. A portion of the conductive material forms a plurality of overlapping conductive strips separated by the insulating material. The plurality of overlapping conductive strips are configured such that, when the out enclosure is breached by, an interruption occurs in at least one of the plurality of overlapping conductive strips. The sensing circuit then detects the interruption and activates the alert circuit to indicate that the outer enclosure has been compromised.

In accordance with an embodiment, the conductive material includes at least one of a metal, carbon black, carbon nanotubes, graphene-polylactic acid composite, metal-based polymer composite, and graphene composition.

In accordance with an embodiment, the insulating material includes at least one of acrylonitrile butadiene styrene (ABS), thermoplastic polyurethane (TPU), plastic, fiber glass reinforcement material, wood fiber, and carbon fiber.

In accordance with an embodiment, a system for containing electronic circuitry therein is disclosed. The system includes an outer enclosure, integrally formed from a conductive material and an insulating material, and an antenna structure embedded within and integrally formed from the conductive material in the outer enclosure. The system further includes a counterpoise, also embedded within and integrally formed from the conductive material in the outer enclosure. The system also includes a first port electrically connected with the antenna structure for providing electrical access to the antenna by the electronic circuitry contained within the system, and a second port electrically connected with the counterpoise for providing electrical access to the counterpoise by the electronic circuitry contained within the system. The antenna structure and the counterpoise are not visible from outside the system, in accordance with an embodiment.

In accordance with an embodiment, a heatsink system includes a fin, including a thermally conductive core, and a plurality of thermally conductive columns, in thermal connection with the thermally conductive core. The heatsink system further includes a support structure partially surrounding the thermally conductive columns, while allowing a portion of each one of the thermally conductive columns to protrude through the support structure. The plurality of thermally conductive columns are configured to draw heat from its surroundings such that the heat is transferred to the fin, from which the heat is dissipated. Furthermore, the fin, the plurality of thermally conductive columns, and the support structure are simultaneously integrally formed using additive manufacturing processes.

In still another embodiment, a system with tamper-resistance features for securely containing components therein includes an outer enclosure, integrally formed from a conductive material and an insulating material, and a sensing circuit connected with the conductive material. The outer enclosure includes outer walls and a floor, covered by a lid. The outer walls and the lid each includes embedded circuitry in electronic communication with each other when the lid is in a proper position with respect to the outer walls. Consequently, if the lid is moved from the proper position, electronic communication between the embedded circuitry is broken and the system senses the outer enclosure has been compromised.

In yet another embodiment, a stacked array interconnect for providing access to electronic circuitry embedded within an insulating material is disclosed. The stacked array interconnect includes a plurality of pads arranged on a surface of the insulating material such that the plurality of pads are electronically accessible from outside the insulating material. The stacked array interconnect also includes a plurality of electronic interconnects embedded within the insulating material and electronically connecting at least a portion of the electronic circuitry with at least one of the plurality of pads. Finally, the stacked array interconnect includes a test point for connecting the plurality of electronic interconnects and providing access thereto from outside the insulating material.

In accordance with another embodiment, an antenna counterpoise system includes an insulating material and a first conductive ring with a first number of arms radiating therefrom and embedded within the insulating material. The system further includes a second conductive ring with a second number of arms radiating therefrom and embedded within the insulating material at a different plane from the first ring. The system also includes a coupler assembly located outside of the insulating material and in electrical communication with the first and second conductive rings so as to provide electronic access to the first and second conductive rings by external electronic components. The first number and the second number are different from each other such that the first and second conductive rings operate as antenna counterpoise for antennas tuned to different frequencies.

BRIEF DESCRIPTION OF THE DRAWINGS

FIG. 18 illustrates a top view of a connector configuration, in accordance with an embodiment.

FIG. 19 illustrates a top view of the connector configuration, with the outer material removed to show the details of the embedded circuitry.

FIG. 20 illustrates a top view of a two-connector configuration, in accordance with an embodiment FIG. 21 illustrates a top view of the two-connector configuration, with the outer material removed to show the details of the embedded circuitry.

DETAILED DESCRIPTION OF EMBODIMENTS OF THE INVENTION

Figure 1:
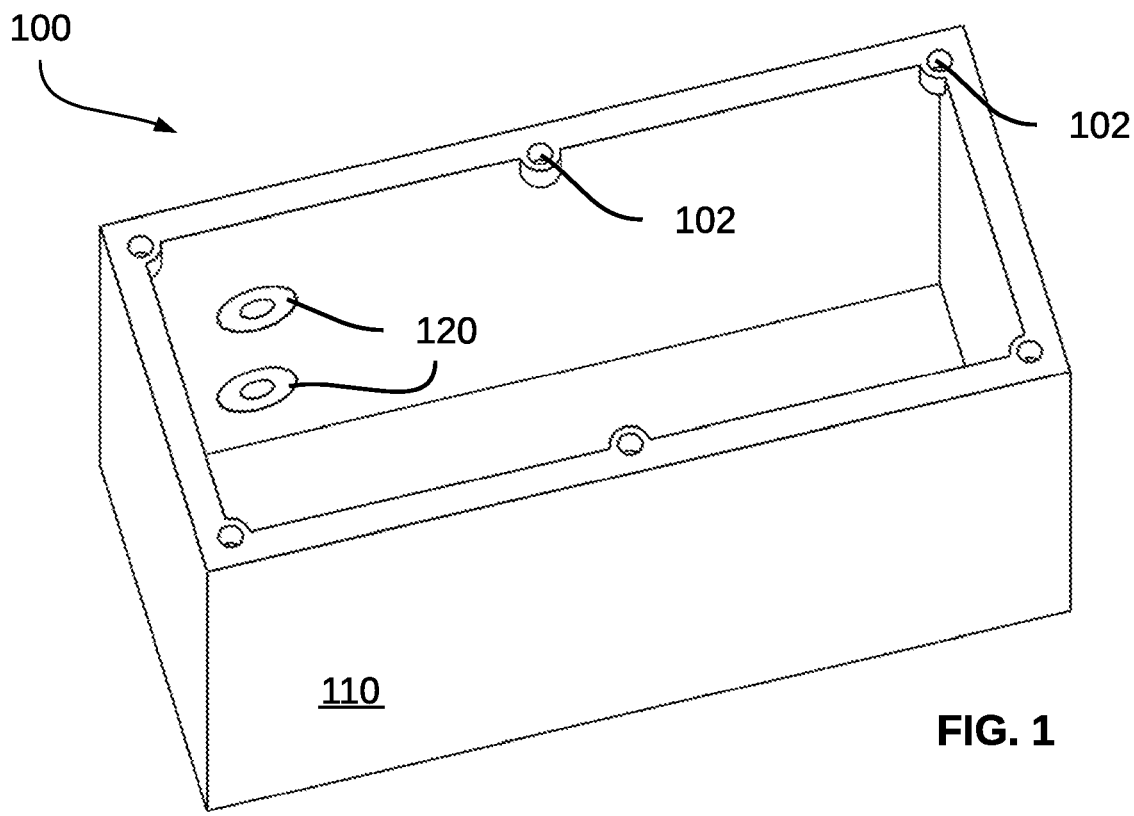
FIG. 1 illustrates an enclosure with security features, in accordance with an embodiment. A lid for the enclosure is not shown.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s)

as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

As mentioned earlier, in security systems, there is a need to create an anti-tamper boundary around electronics to protect them against physical attacks. For example, an attacker may attempt to access the internal electronics of a machine containing security-sensitive information by opening the outer enclosure of the machine, or even by drilling a small hole in the outer enclosure so as to be able to insert a small camera to view the internal components of the machine, or insert an RF probe (such as the COOLIEF Cooled Radio Frequency Probe from Halyard Worldwide, Inc.), thus allowing the attacker to reverse engineer the operation of the machine. The attacker may also attempt to wirelessly skim sensitive information, if the machine wirelessly transmits or receives data.

One example of a security system is the keypad on an automated teller machine (ATM). A user enters a personal identification number (PIN) code using the ATM keypad, which is then received at a processor within the ATM (See, for example, U.S. Pat. No. 5,832,206 to De Jesus, et al.). ATMs generally require an anti-tamper boundary mechanism incorporated into its enclosure structure so as to protect the electronic components contained therein against intruder access. Ideally, the anti-tamper boundary mechanism detects when the enclosure structure has been breached by unauthorized removal of an access panel, or by invasive means, such as by drilling through the enclosure.

Existing anti-tamper bounder mechanisms include, for example, the addition of a wire "mesh" on an internal wall of the machine enclosure such that, if the mesh is broken by an intruder attack, then the breach is detected and sensitive data within the machine may can be deleted or the appropriate authorities notified. For example, U.S. Patent Application Serial Number 2009/0145973 to Farooq, et al., discloses an IC module including a conductive grid structure embedded within the chip carrier and the cap structure configured so as to detect an attempt to penetrate the IC module. Such mesh configurations are generally formed using a laser or wet etch and deposition process, which limits the flexibility in design and materials used, as well as raising concerns regarding the compatibility and structural integrity of the resulting enclosure. Additionally, wire mesh configurations may still be breached by, for instance, drilling between the wires with a very small drill bit.

Embodiments of the present invention are described herein with reference to the figures, described in detail hereinafter. The embodiments described herein overcome the shortcomings of the existing art in a variety of ways, as illustrated below.

FIG. 1 shows an enclosure 100 including tamper-resistant features, in accordance with an embodiment as will be described in detail immediately below. It should be noted that a lid (not shown) has been removed from enclosure 100 in order to better illustrate the internal components therein. Enclosure 100 includes a plurality of holes 102 for securing the lid (not shown) onto a box 110. Enclosure 100 also includes a pair of antenna connections 120, through which an electrical connection to an embedded antenna may be made.

Figure 2:
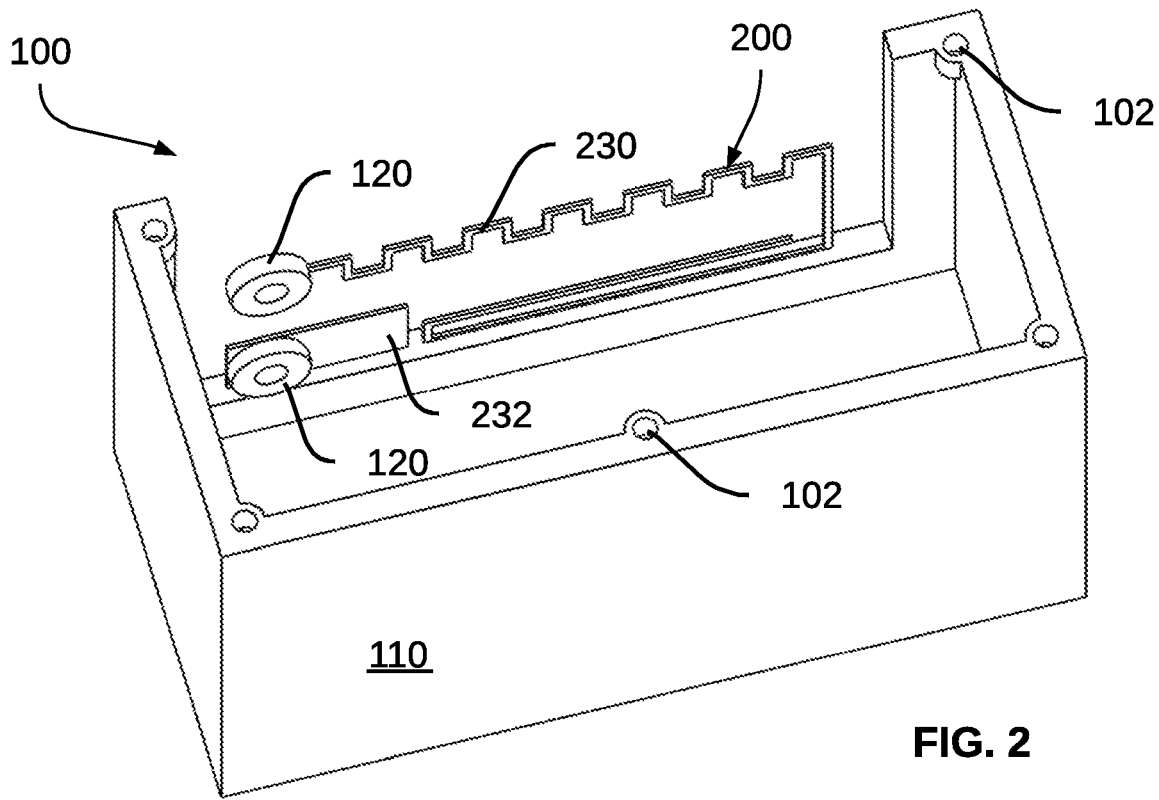
FIG. 2 illustrates the enclosure with security features, with a portion of the wall removed to show an exemplary configuration of an embedded antenna, in accordance with an embodiment.

Further details of the embedded antenna are shown in FIG. 2, which illustrates enclosure 100 of FIG. 1 with a portion of the material forming box 110 to show an embedded antenna 200. Embedded antenna 200 includes a wire antenna 230 and a ground plane 232, both of which are electronically accessed via the pair of antenna connections 120.

Figure 3:
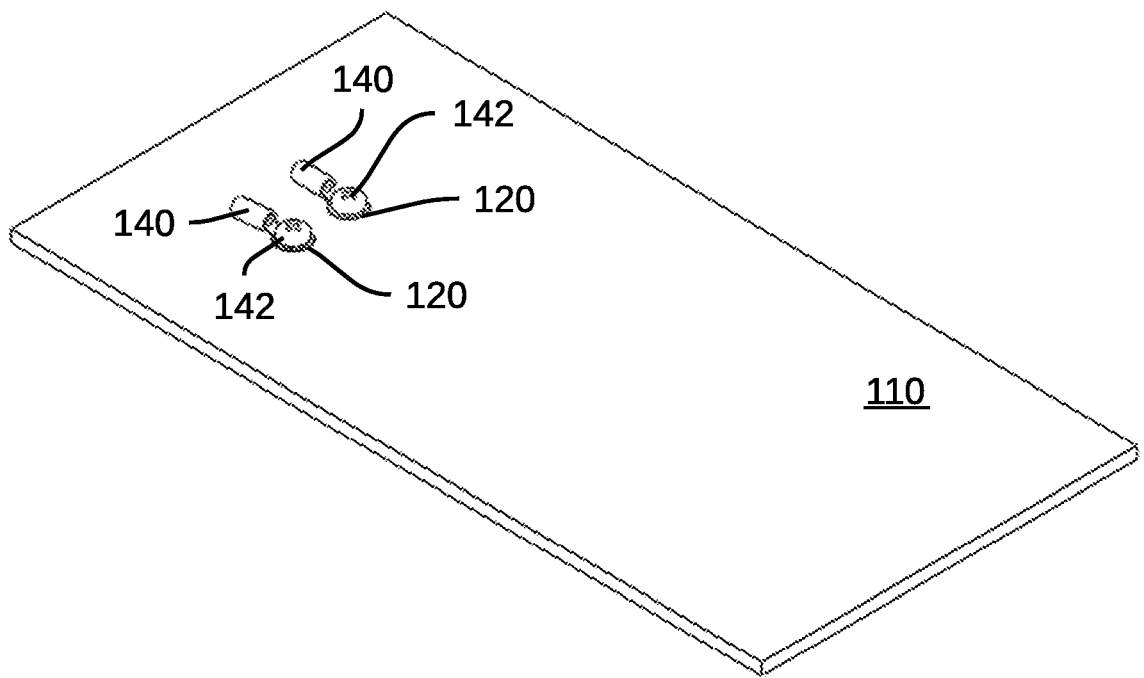
FIG. 3 illustrates an isolated view of the back wall of the enclosure, shown here to illustrate an exemplary configuration for attaching a pair of connectors thereon, in accordance with an embodiment.
Figure 4:
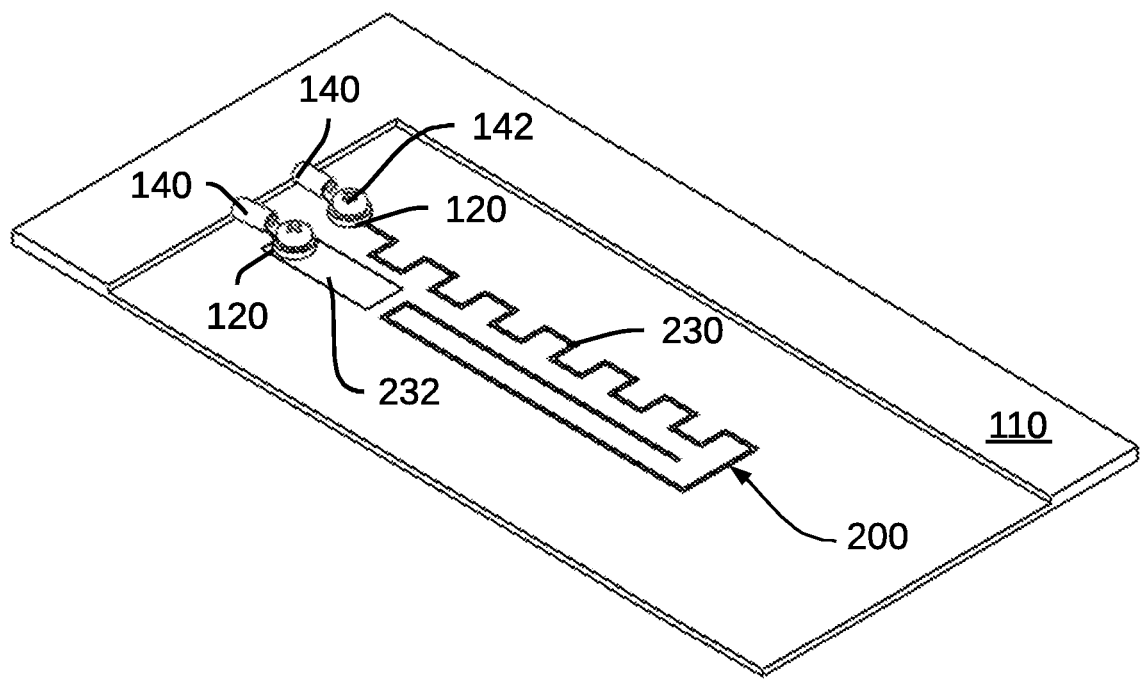
FIG. 4 illustrates the isolated view of the back wall of the enclosure, with a portion of the wall material removed to show an exemplary configuration of an embedded antenna with the pair of connectors attached thereto, in accordance with an embodiment.

FIGS. 3 and 4 illustrate isolated views of the same antenna connections and embedded antenna configuration, shown here with connectors 140 connected with antenna connections 120 attached by screws 142. FIG. 3 shows an isolated view of the back wall of box 110, while FIG. 4 shows the same isolated view with a portion of the wall material removed to show details of embedded antenna 200 embedded within box 110.

A key aspect of the configuration of embedded antenna 200 is that, rather than having been manufactured by first forming box enclosure, etching away a portion of a wall of the box enclosure, depositing a conductive material to form the wire antenna, then enclosing the wire antenna with additional material, embedded antenna 200 has been formed by additive manufacturing methods such that box 110, embedded antenna 200, and even antenna connections 120 are integrally formed in a continuous manufacturing process without requiring wet etch or deposition processes.

A variety of additive manufacturing solutions (also commonly referred to as 3D printing) exist and any additive manufacturing process can be used to manufacture the enclosure with tamper-resistant features of the present embodiment, particularly those processes involving the simultaneous printing of multiple materials using multiple feed nozzles or the ability to cleanly change supplied materials from a single feed the during the printing process. Such an integrative manufacturing process allow the simultaneous manufacture of both the enclosure material as well as circuitry embedded therein, with additional advantages in the design of the embedded features, as will be further described below.

A key aspect of the additive manufacturing process suitable for use in manufacturing the embodiments described herein is the ability to intermix materials (e.g., an insulating material and a conductive material) in a single print layer. The additive manufacturing process further enables the ready manufacturing of heretofore impossible or difficult structures for tamper-resistance and tamper-detection. Suitable materials for use in manufacturing the embodiments shown herein are, for example and not limited to, printable metals and graphene compositions for the conductive material, and plastics, fiber glass reinforcement materials, wood fiber, and carbon fiber.

In an exemplary embodiment, a multi-head 3D printing approach may be used to print both conductive and non-conductive materials in a multi-layer, additive process. At least one print head contains a conductive material, such as a metal or a graphene mixture, while at least one other print head contains a non-conductive material, such as a plastic, a glass fiber, carbon fiber, or other suitable material. After an overall embedded circuit and enclosure design has been finalized, a 3D printing designer would convert the design using a slicer program to create commands to the printer nozzles for printing the additive layers. In this way, an enclosure system with embedded security features can be integrally formed in a continuous process, without the need for wet or laser etching and deposition processes.

Figure 5:
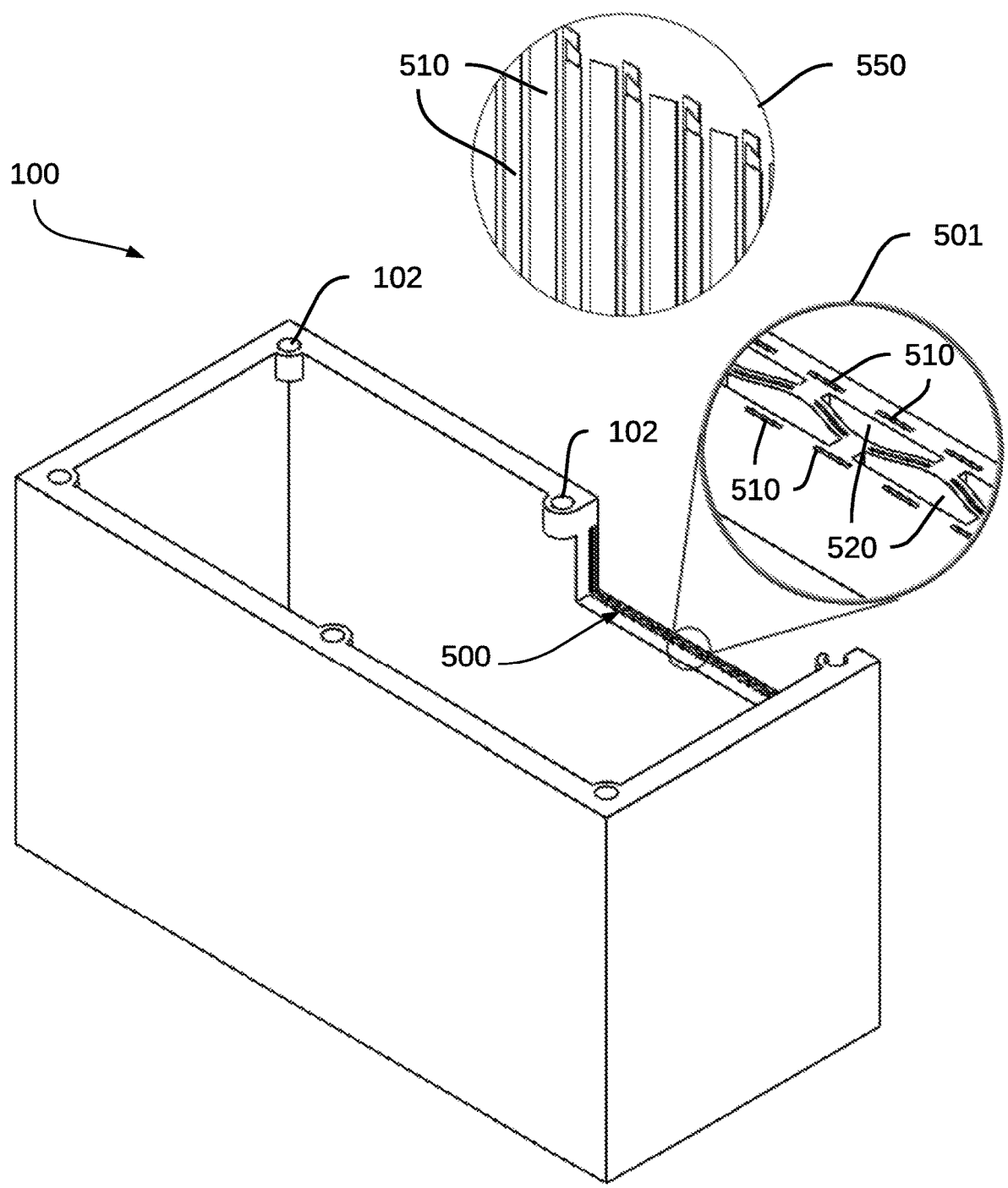
FIG. 5 illustrates additional security features that may be embedded into the enclosure with security features, in accordance with an embodiment, shown here with a portion of the wall removed to show the internal details of embedded circuitry therein.

FIG. 5 shows a rotated view of enclosure 100, shown here with another portion of box 110 cut away to illustrate details of a security mesh 500, in accordance with an embodiment. An inset 501 shows details of security mesh 500, which includes a plurality of conductive strips 510, which run the length of box 110 from top to bottom, in the present view as shown in FIG. 5. Conductive strips 510 are oriented such that conductive strips in different layers within the walls of box 110 are overlapped, when viewed from outside of box 110. In this way, unlike previous versions of wire mesh, there is essentially no space through which a hole may be drilled through enclosure 100 without breaking one or more of conductive strips 510. An isolated view of conductive strips 510, with the material forming the wall of box 110 removed, is shown in an inset 550.

Continuing to refer to FIG. 5, security mesh 500 may also include a plurality of channels 520, also running the length of box 110 from top to bottom in the shown embodiment. Cavities 200 are configured such that, if an external compressive force is applied to box 110 and channels 520 become compressed or crushed, then one of more of conductive strips 510 are disturbed or broken, thus alerting the operator to an attempt for unauthorized access into enclosure 100.

Channels 520 also provide acoustic dampening against acoustic attacks to the electronics contained within enclosure 100. For instance, side-channel attacks or by capturing acoustic emissions are known threats to computer security (See, for example, "Stealing Keys from PCs using a Radio: Cheap Electromagnetic Attacks on Windowed Exponentiation" by D. Genkin, et al. (https://eprint.iacr.org/2015/170.pdf) and "RSA Key Extraction via Low-Bandwidth Acoustic Cryptanalysis" by D. Genkin, et al. (http://www-.cs.tau.ac.il/~tromer/acoustic/)). Conductive strips 510 and channels 520 provide additional insulation and interference to help thwart such side channel attacks.

Figure 6:
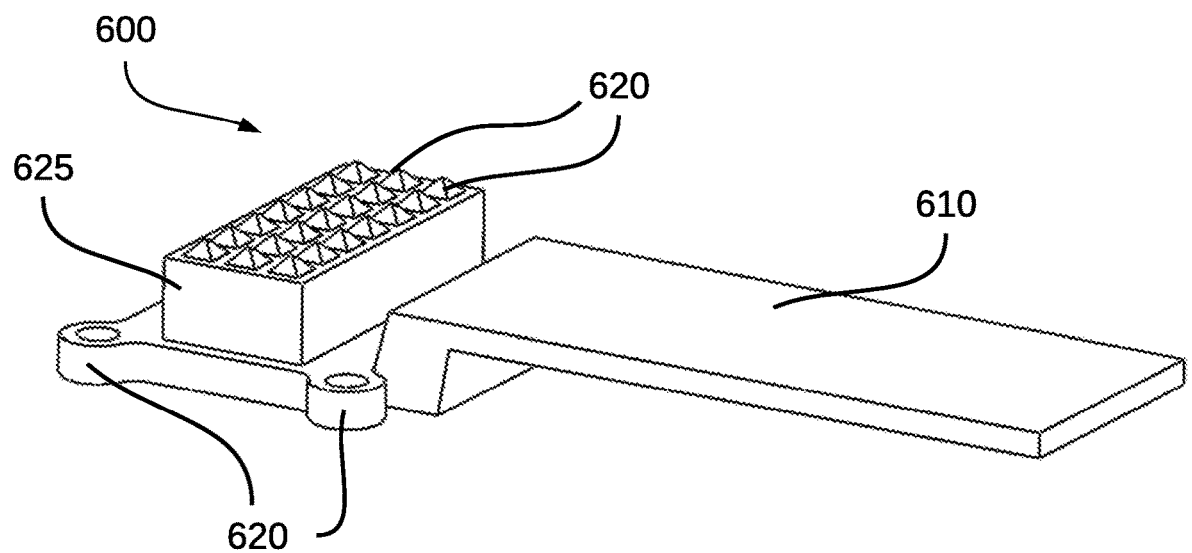
FIG. 6 illustrates a configuration for a heatsink, in accordance with an embodiment, shown here in elevation.

The use of the additive manufacturing approach to the formation of enclosures with security features also lends itself to the design and integration of other structures that maybe used with the enclosure or in applications outside of security devices. An example of such a device is a heat sink illustrated in FIGS. 6-9. FIG. 6 shows, in elevation, a heat sink 600 including a fin 610, a plurality of columns 620 supported within a support structure 625, and a plurality of attachment holes 630 for attaching heat sink 600 to the surface for which heat mitigation is desired.

Figure 7:
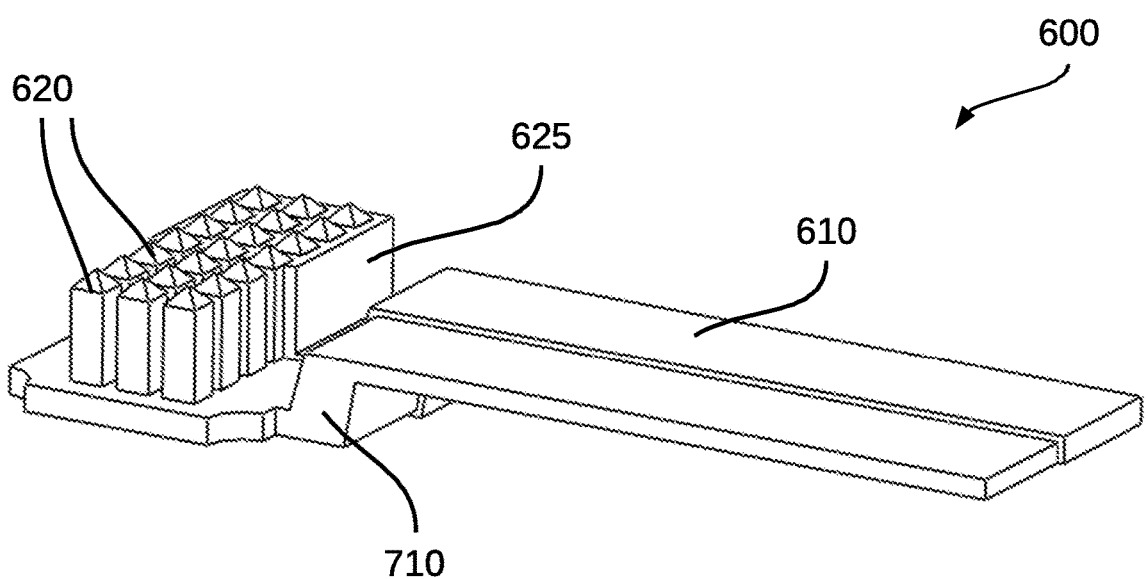
FIG. 7 illustrates the heatsink, shown here with a portion of the outer material removed to better illustrate the internal configuration of the components, in accordance with an embodiment.
Figure 8:
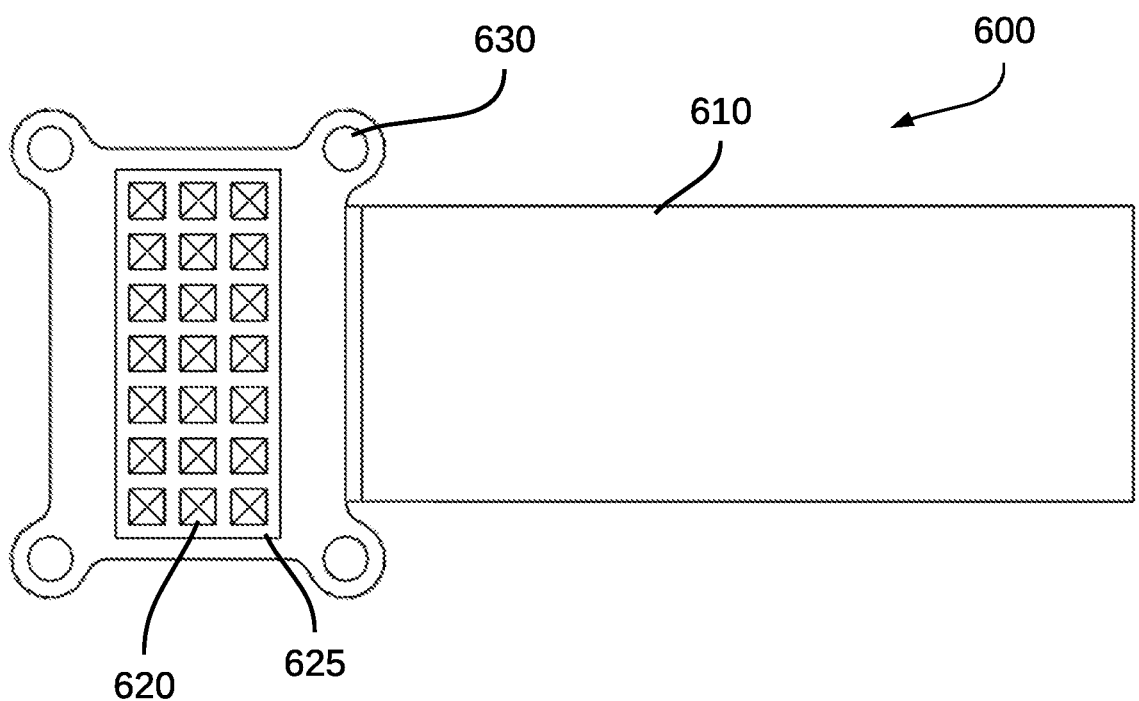
FIG. 8 shows a top view of the heatsink, in accordance with an embodiment.
Figure 9:
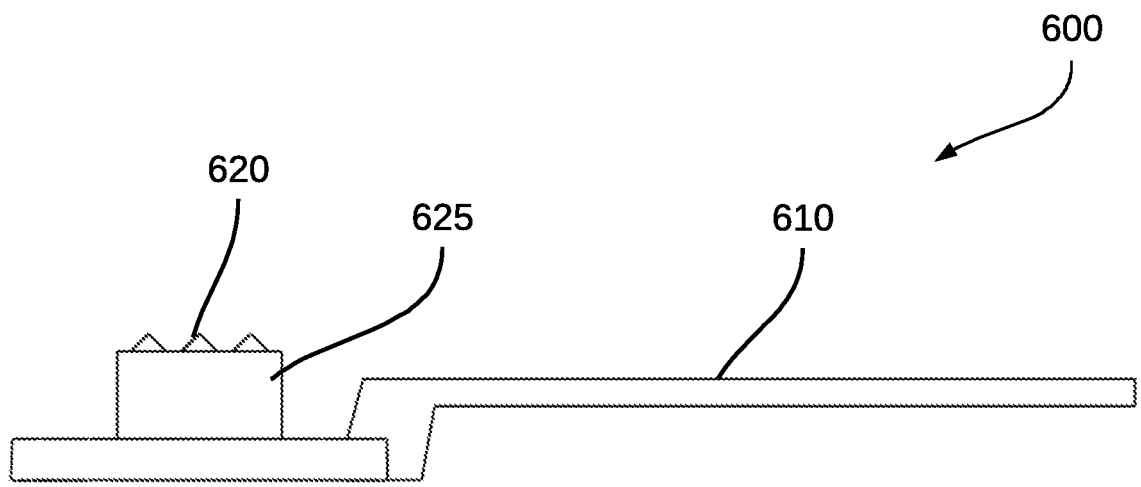
FIG. 9 shows a side view of the heatsink, in accordance with an embodiment.

FIG. 7 shows further details of the internal configuration of heat sink 600, with a portion of support structure 625, attachment holes 630, and the outer material enclosing fin 610 removed to show a core 710. Columns 620 and core 710 are thermally conductive and are thermally connected to each other such that columns 620 pull heat out of the environment or the surface to which heat sink 600 is attached, then transfers the heat via core 710 to be radiated from fin 610. FIG. 8 shows a top view of heat sink 600, and FIG. 9 shows a side view of heat sink 600, shown here to illustrate the orientation of the different components within heat sink 600. All parts of heat sink 600 can be integrally formed in a single process by additive manufacturing methods using at least two different materials to form the thermally conductive components at the same time as the insulating components.

Figure 10:
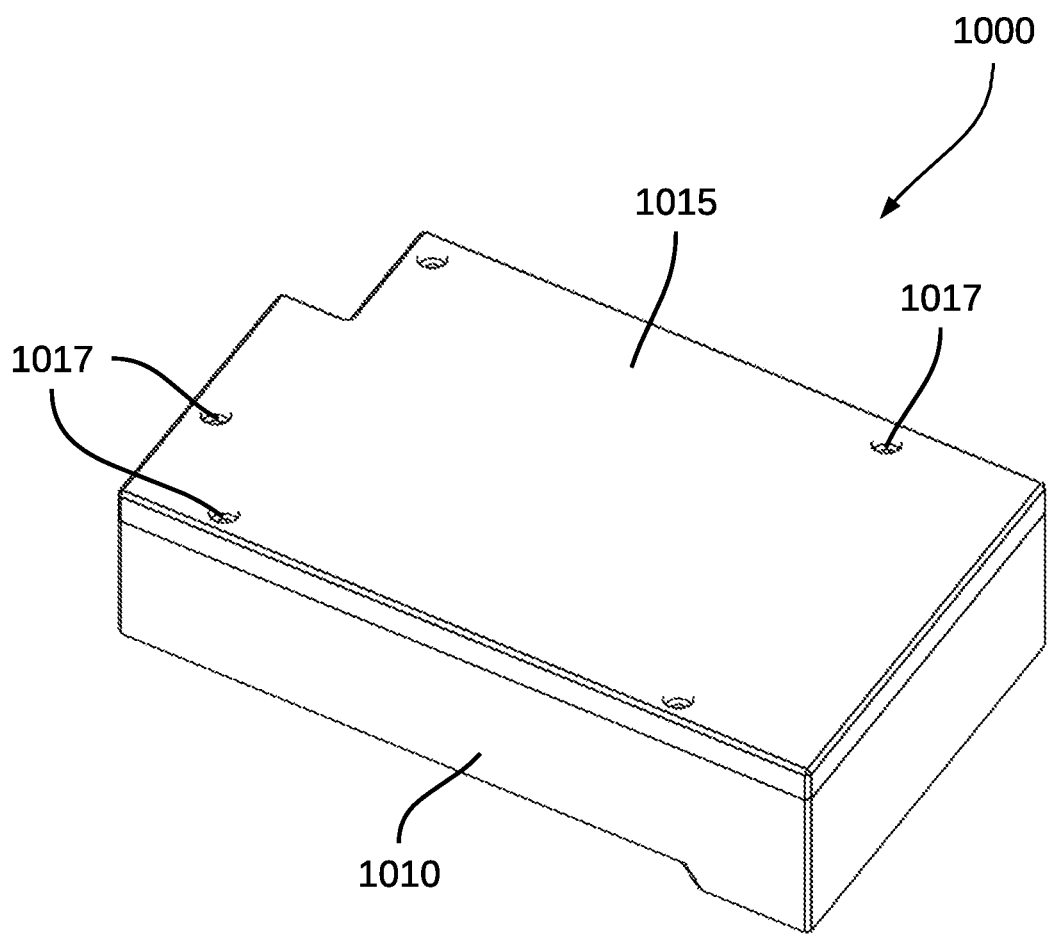
FIG. 10 illustrates another enclosure with security features, shown here with an optional lid attached.
Figure 11:
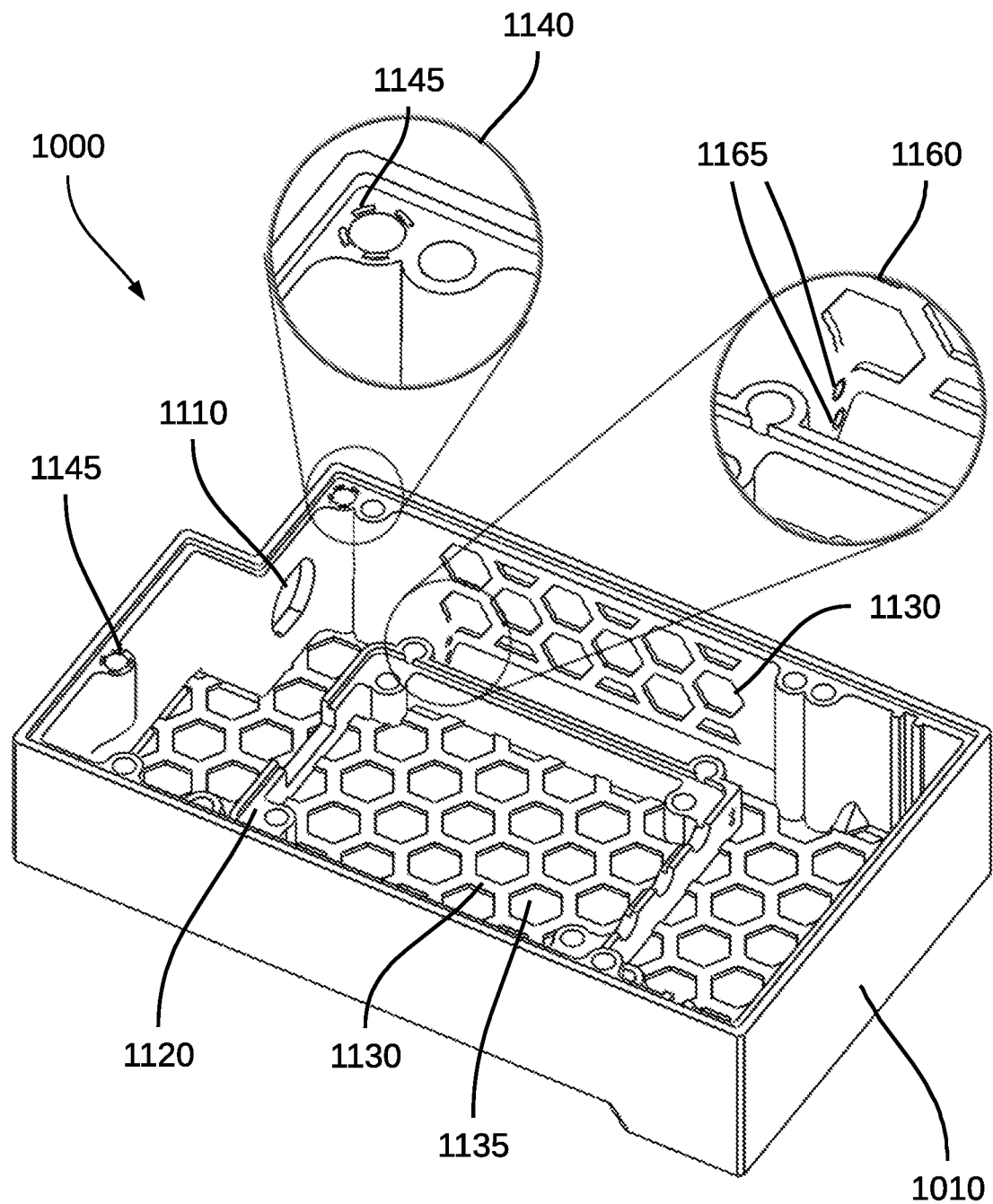
FIG. 11 illustrates the internal features within the enclosure, in accordance with an embodiment, with the lid removed.

Turning now to FIGS. 10-13, another embodiment of an enclosure including security features is illustrated. An enclosure 1000, from the outside as shown in FIG. 10, looks like an ordinary enclosure, including a box 1010 covered by a lid 1015, with a plurality of holes 1017 through which lid 1015 is affixed to box 1010. When lid 1015 is removed, as shown in FIG. 11, a variety of security features become visible.

Continuing to refer to FIG. 11, the inner details of enclosure 1000 are shown with the lid removed. As an option, an access port 1110 provides access to components within enclosure 1000. As shown in FIG. 11, enclosure 100 includes an inner frame 1120, onto which electronic components, such as a printed circuit board, can be attached. Also optionally, inner frame 1120 may be formed of insulating materials such that electronic components mounted thereon are electrically isolated from the rest of enclosure 1000. The inner surfaces of box 1010 further includes honeycomb features 1130 integrated into the material forming box 1010. As an example, honeycomb features 1130 may be formed of conductive materials separated by apertures 1135 so as to form a part of a security mesh embedded into the inner surface of box 1010.

Certain features of enclosure 1000 are highlighted in insets. As shown in a first inset 1140, a first end 1145 of an integrated connector (not visible in FIG. 11), which has been embedded within box 1010. A second inset 1160 shows second ends 1165 of the integrated connector. Integration of the integrated connector into the walls of box 1010 provides advantages in protecting the connector from getting jostled, broken, or shorted during handling of enclosure 1000.

Figure 12:
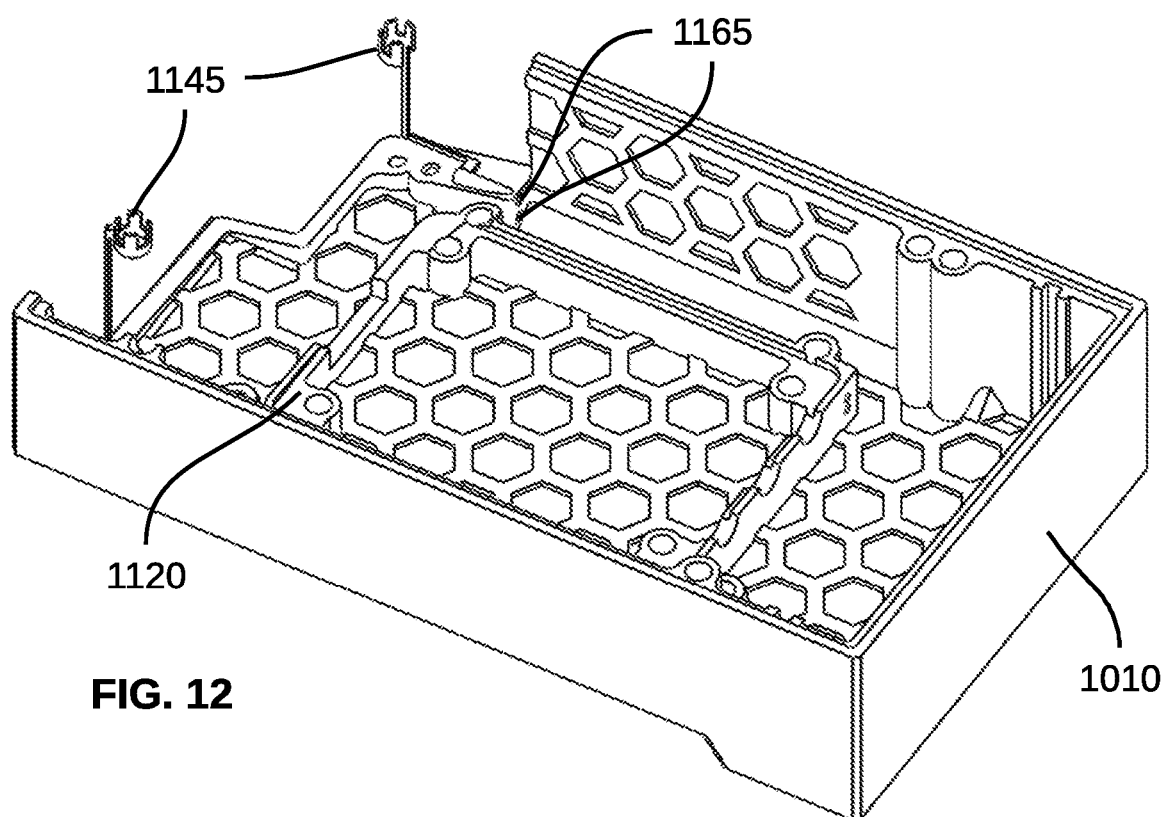
FIG. 12 illustrates further details of connectors embedded within the walls of the enclosure, shown here with a portion of the outer material removed, in accordance with an embodiment.
Figure 13:
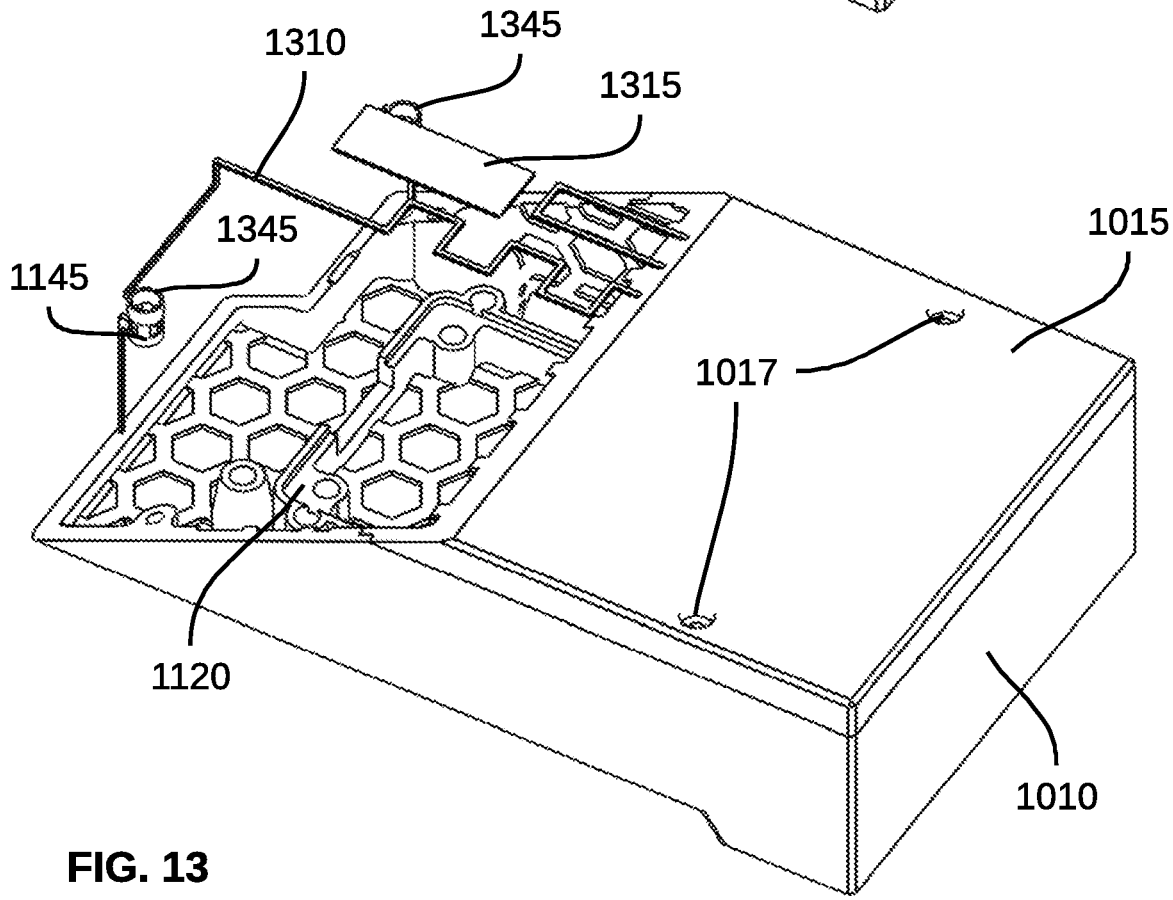
FIG. 13 illustrates further details of the enclosure, shown here with a portion of the outer material removed to show a configuration in which the electronic circuitry in the case is connected with an embedded antenna in the lid.
Figure 14:
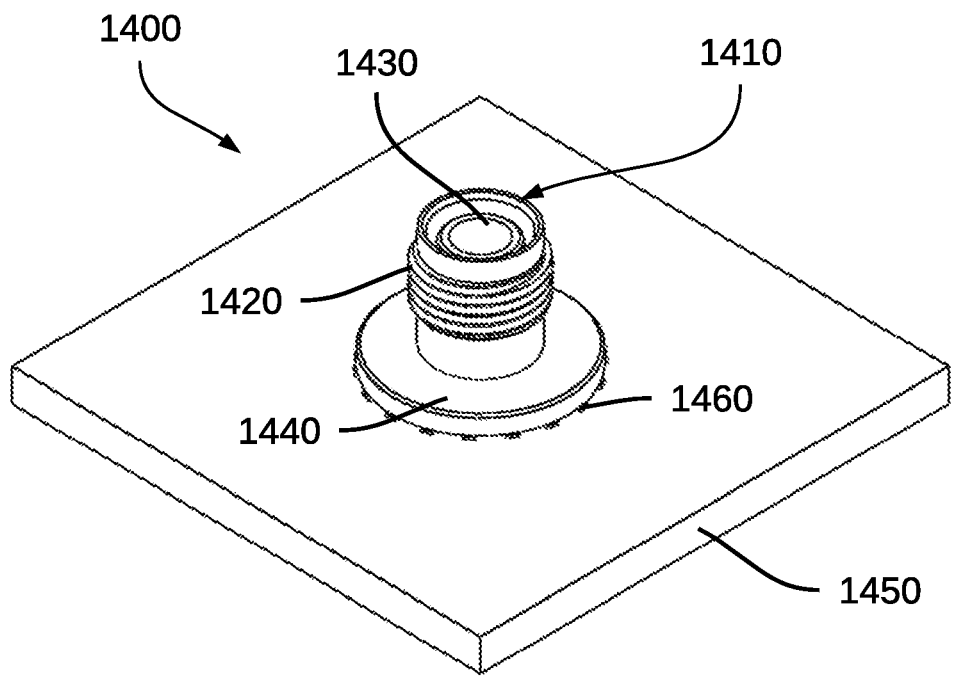
FIG. 14 illustrates an embedded counterpoise configuration, in accordance with an embodiment.

Further details of the integrated connector are shown in FIG. 12, which shows the internal components of enclosure 1000, with portions of box 1010 removed. As is visible in FIG. 12, first ends 1145 of the integrated connector are configured to just flush with a top edge of box 1010 (as shown in FIG. 11), while being connected within the walls of box 1010 through to second ends 1165. In an exemplary embodiment, shown in FIG. 13, an antenna structure 1310 and a ground plane 1315 are embedded within lid 1015. Antenna structure 1310 and ground plane 1315 are connected via couplers 1345 with first ends 1145 of the integrated connector embedded within box 1010. If lid 1015 is removed by an unauthorized user, for instance, the disconnection of couplers 1345 in the lid from first ends 1145 of box 1010 can trigger a shutdown sequence to protect data stored on electronic components mounted within enclosure 1000.

Another heretofore unavailable embedded circuit design enabled by the use of additive manufacturing is an embedded antenna counterpoise arrangement. Referring now to FIGS. 14-17, an exemplary arrangement of a counterpoise, in accordance with an embodiment, is illustrated. A counterpoise arrangement 1400 includes a coupler assembly 1410, which in turn includes threads 1420 for connecting with external connectors, a core 1430 through which electrical connection can be made to components on the other side of coupler assembly 1410, and a washer arrangement 1440. Coupler assembly 1410 is connected through an insulating material 1450 with coupler ring 1460.

Figure 15:
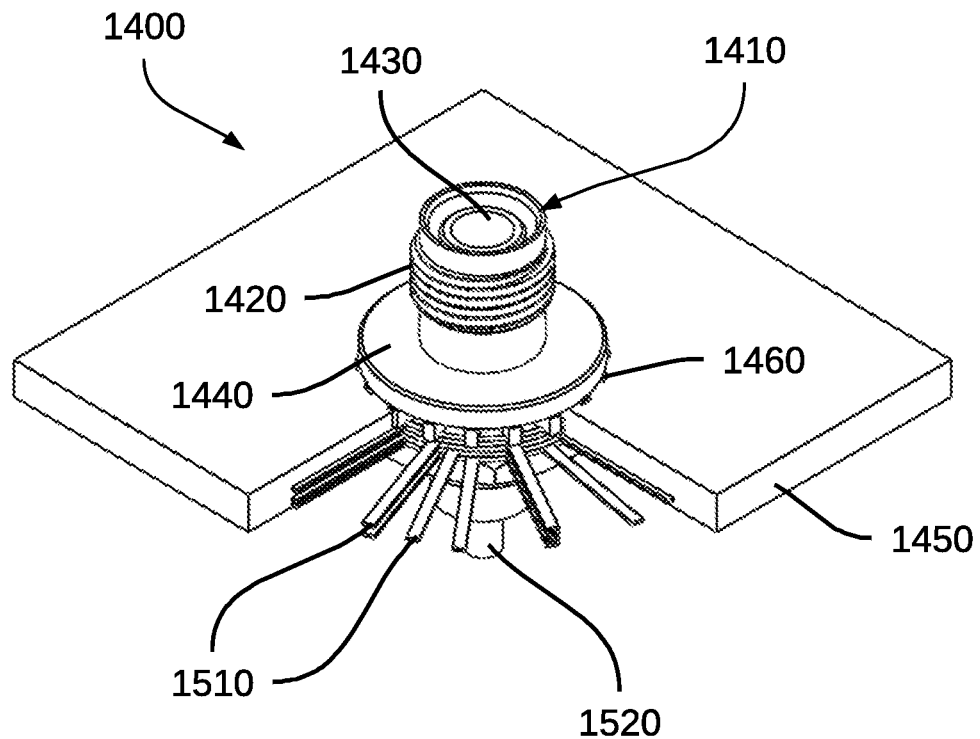
FIG. 15 illustrates the embedded counterpoise configuration, in accordance with an embodiment, shown here with a portion of the outer material removed to show details of the embedded features.
Figure 16:
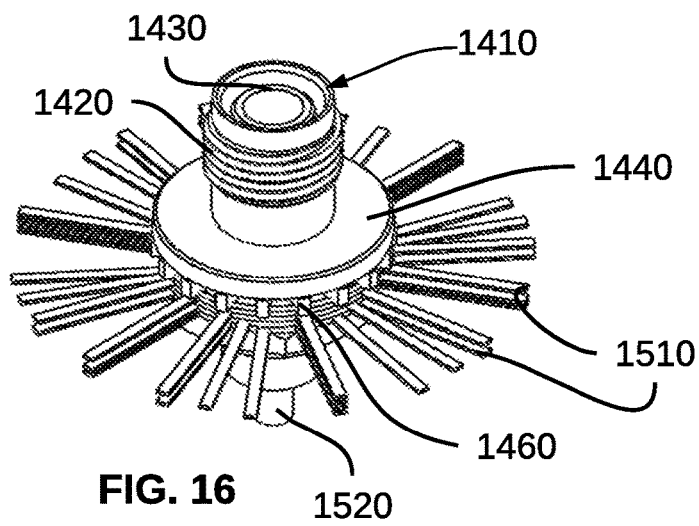
FIG. 16 illustrates the embedded counterpoise configuration, in accordance with an embodiment, with the enclosing material removed.

Further components embedded within insulating material 1450 are shown in FIG. 15, in which a portion of insulating material 1450 has been removed. In FIG. 15, a plurality of radial arms arrangement 1510 embedded within insulating material 1450 are visible, as well as a back end 1520 of coupler assembly 1410. FIG. 16 shows coupler assembly 1410 as well as radial arms arrangement 1510 with all of the insulating material removed.

Figure 17:
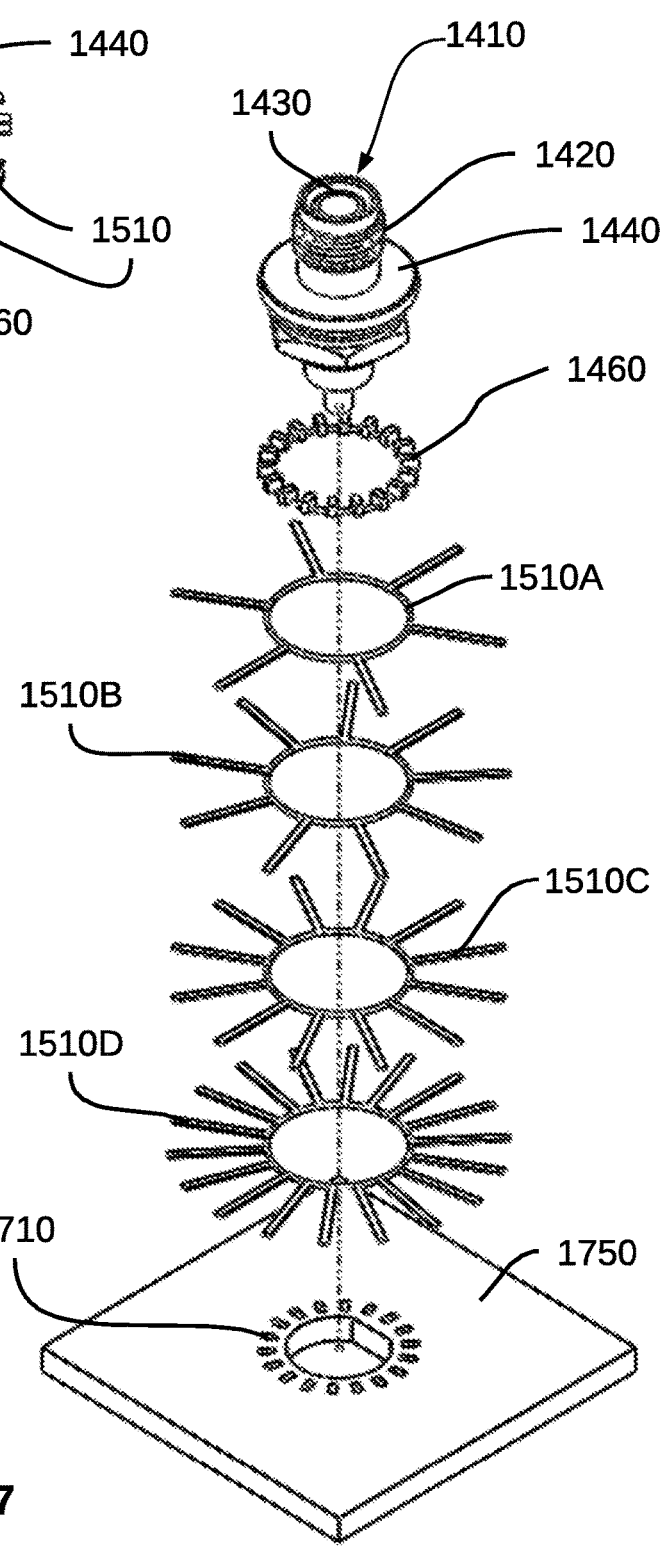
FIG. 17 illustrates an exploded view of the embedded counterpoise, again with the outer material removed, shown here to illustrate the details of the components, in accordance with an embodiment.

Details of the radial arms are better visible in FIG. 17, which shows an exploded view of the coupler assembly 1410 along with a plurality of radial arms connecting with a plurality of pads 1710 embedded within an insulating material 1750. As may be seen in FIG. 17, each of radial arms arrangements 1510A, 1510B, 1510C, and 1510D in this exemplary embodiment have different numbers of radial arms emanating from a central ring. The number of arms in each radial arms arrangement corresponds to a particular antenna frequency such that, with multiple radial arms arrangements tuned to different frequencies, this counterpoise design can be used with multiple selected antenna frequencies.

Examples of configurations for pads 1710 are shown in FIGS. 18-21. In FIG. 18, a single embedded connector system 1800 is shown. Embedded connector system includes, embedded within an insulating material 1810, a plurality of pads 1820 around a hole 1830. A test point 1840 is also visible and embedded within insulating material 1810.

The internal connections within embedded connector system 1800 may be better seen with insulating material 1810 removed for clarity. As may be seen in FIG. 19, pads 1820 serve as an interface to external components via, for instance, coupler ring 1460. Pads 1820 are connected, within insulating material 1810, by a ring wire 1910. Certain pads 1820 are also connected via wires 1920, also embedded within the insulating material, to test point 1840.

Two or more of embedded connector systems 1800 can be connected together, as shown in FIGS. 20 and 21. FIG. 20 shows the surface-visible portions of two embedded connector systems, which are coupled together internally (not visible in FIG. 20) within insulating material 2010. As shown in FIG. 21, the embedded connector systems may be connected, within the insulating material via a connective serpentine 2110, for example. Such connection systems are useful in providing electrical connections to otherwise buried components within an insulating material, while providing flexibility in the design of the electrical components.

Figure 22:
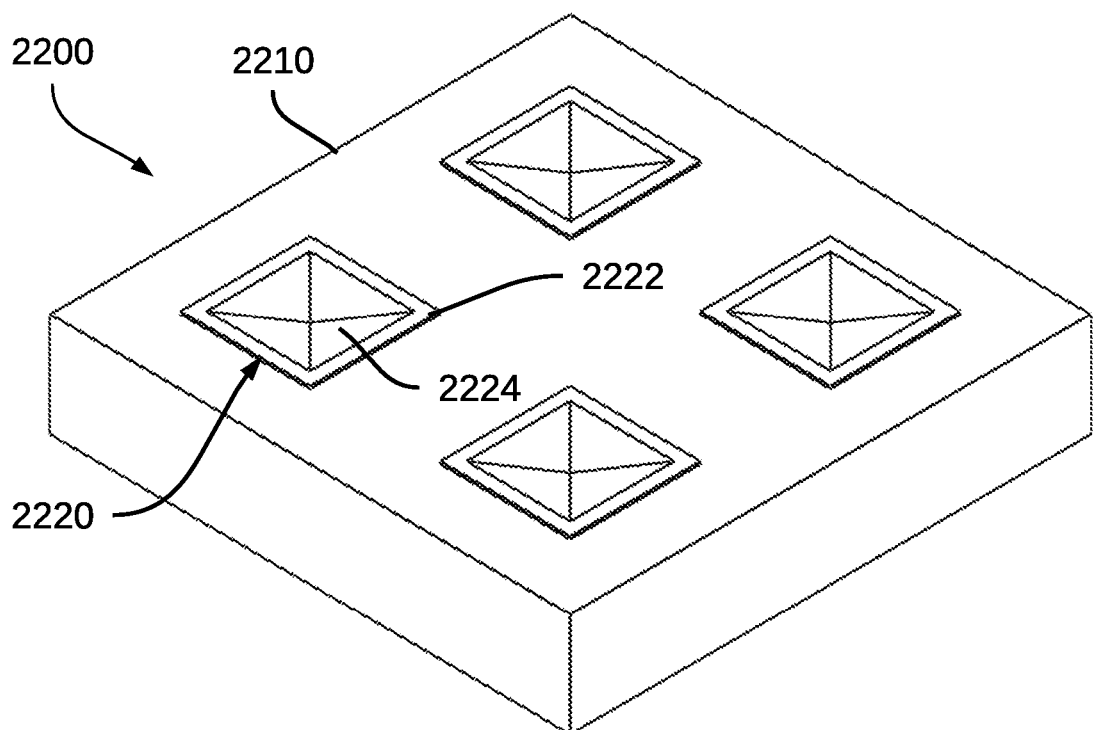
FIG. 22 shows an ISO view of an exemplary enclosure system with an embedded heatsink array, in accordance with an embodiment.
Figure 23:
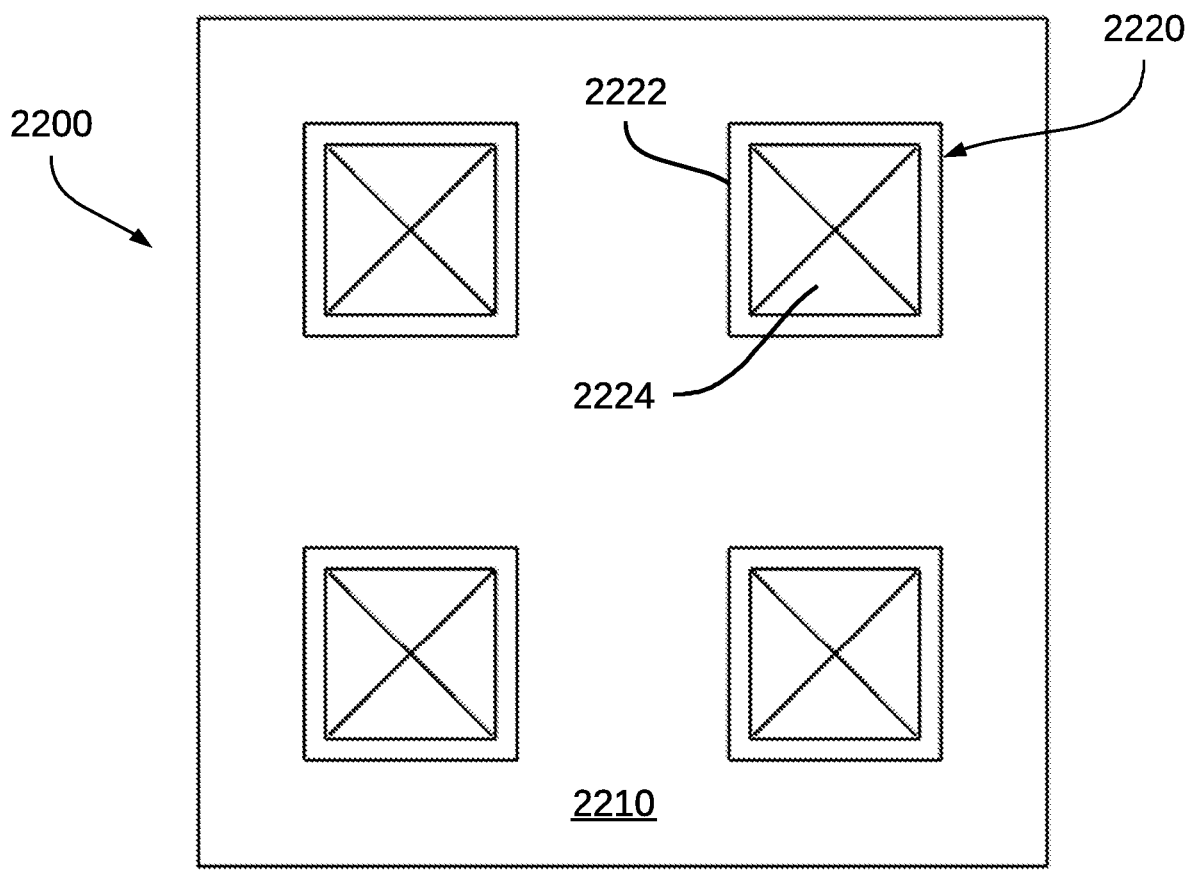
FIG. 23 shows a top view of an exemplary enclosure system with an embedded heatsink array, in accordance with an embodiment.

Turning now to FIGS. 22 and 23, ISO and top views of an exemplary embodiment of an enclosure system with an embedded heatsink array are shown. As shown in FIGS. 22 and 23, an enclosure system 2200 includes an insulting enclosure 2210 with an array of heatsink arrangements 2200. It is noted that, while an array of heatsink arrangements is shown in FIGS. 22-25, a single heatsink arrangement can be effectively used in small or space-constrained applications.

Continuing to refer to FIGS. 22 and 23, insulating enclosure 2210 can optionally include tamper-resistance features, embedded electronic circuitry, embedded interconnects, and/or embedded antenna counterpoise therein (not shown). Each one of heatsink arrangements 2200 includes an outer rim 2222 and a heat transfer surface 2224. Heat transfer surface 2224 is configured as an inverted (sunken) pyramid, in this exemplary embodiment. The inverted pyramid structure is chosen to provide increased surface area for the heat transfer surface, while also being relatively simple to manufacture using conventional or additive manufacturing techniques. Other geometrical shapes, such as trapezoids, circles, spherical segments, and other polygons are also contemplated for specific applications.

Insulating enclosure 2210 is formed of an insulating material such as plastic, fiber glass, carbon fiber, KEVLAR® aramid fiber, XSTRAND™ glass fiber, ceramics, and others mentioned above. Heatsink arrangements 2200 are formed, for example, of thermally conductive materials such as graphene, metal, and others mentioned above. While heatsink arrangements should be formed of a thermally conductive material, they may also be formed of a thermally conductive, yet electrically non-conductive material. Forming the heatsink arrangement from a thermally conductive, yet electrically non-conductive material allows the integration of the heatsink arrangements in close proximity to electronic circuitry without interfering with the functions thereof.

In an embodiment, enclosure system 2200 is produced using additive manufacturing techniques such that insulating enclosure 2210 and array of heatsink arrangements 2200 are additively produced in a single production run. For instance, multi jet or multiple head printing techniques are used to build enclosure system 2200, including both the insulating enclosure and heatsink arrangements, in layers in a single production run. The integrated production by additive manufacturing of insulating enclosure 2210, array of heatsink arrangements 2200, and, optionally, tamper-resistance and security features is particularly advantageous as the enmeshing of the various layers and components as a result of the additive manufacturing yields an overall enclosure with superior water resistance and tight seals, even between the enclosure and the array of heatsink arrangements.

Figure 24:
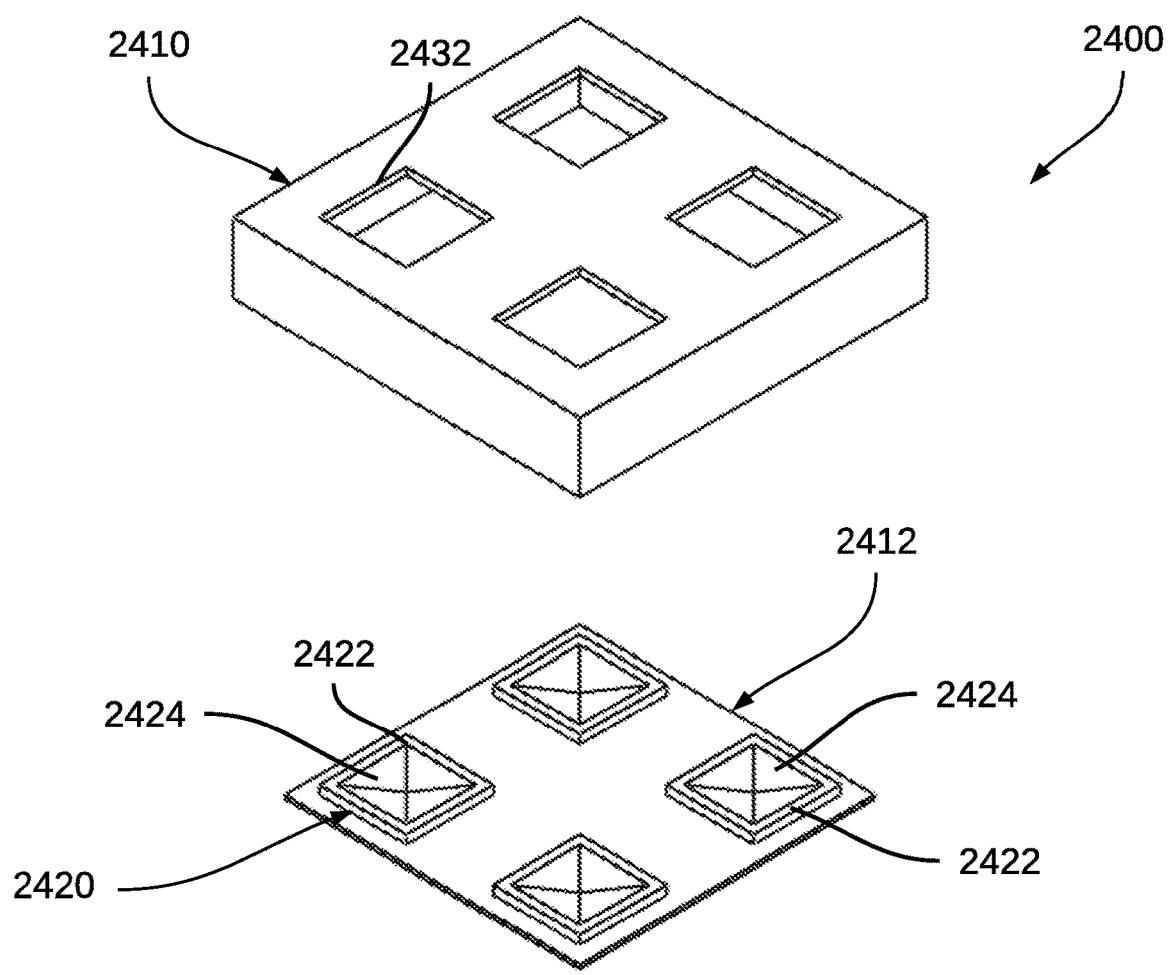
FIG. 24 shows an exploded view of an exemplary enclosure system with an embedded heatsink array, in accordance with an embodiment.
Figure 25:
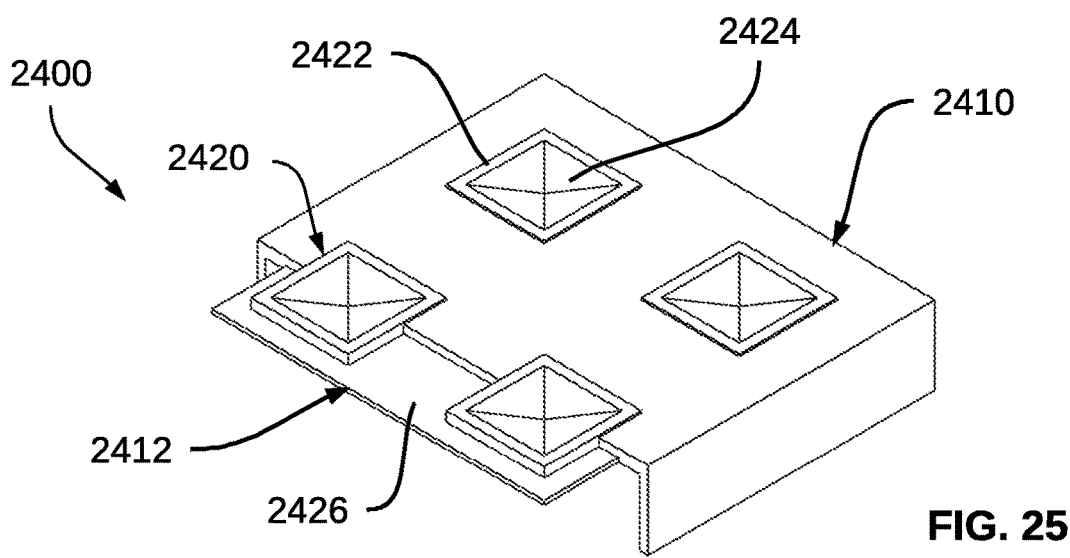
FIG. 25 shows an assembled exemplary enclosure system with an embedded heatsink array, shown here in a partial cutaway view, in accordance with an embodiment.

In an alternative embodiment, the insulating enclosure and one or more heatsink arrangements can be formed separately then assembled. Such an alternative assembly is illustrated in FIGS. 24 and 25. FIG. 24 shows an exploded view of an enclosure system 2400 with an embedded heatsink array, in accordance with an embodiment. FIG. 25 shows the assembled enclosure system 2400 with an embedded heatsink array, shown here in a partial cutaway view.

As shown in FIGS. 24 and 25, enclosure system 2400 includes an enclosure 2410 and a heatsink substrate 2412. Heatsink substrate 2412 supports one or more heatsink arrangements 2420 thereon. In an embodiment, each one of heatsink arrangements 2420 includes an outer rim 2422 and a heat transfer surface 2424. While an array of four heatsink arrangements 2412 is shown in FIGS. 24 and 25, some application require fewer heatsinks. Even one heatsink, enclosed in an enclosure as described herein, is effective for heat transfer in certain applications. Additionally, while heatsink arrangements 2420 are shown to include an inverted pyramid structure as the heat transfer surface, other geometrical shapes are contemplated to match the needs of specific applications.

Continuing to refer to FIGS. 24 and 25, enclosure 2410 of enclosure system 2410 further includes openings 2432 to match the array of heatsink arrangements 2420 such that each one of the heatsink arrangements matingly engages with one of the openings in the enclosure, as shown in FIG. 25. Heatsink substrate 2412, outer rim 2422, enclosure 2410, and/or openings 2432 can include retention features (not shown), such as clips, snaps, dovetails, and the like, in order to ensure heatsink substrate 2412 is held against enclosure 2410. Additional features, such as one or more gaskets and/or sealants, can also be used to ensure a water-tight seal between heatsink substrate 2412 and enclosure 2410. Furthermore, enclosure 2410 can optionally include tamper-resistance features, embedded electronic circuitry, embedded interconnects, and/or embedded antenna counterpoise therein (not shown) as previously described elsewhere in the present disclosure.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, newly developed materials suitable for additive manufacturing may be used to form the conductive and insulating components in the embodiments described above. Moreover, alternative additive manufacturing techniques, such as other methods for simultaneously dispensing conductive and insulating materials, may be adapted for fabricating the embodiments described above. Furthermore, while additive manufacturing methods, such as 3D printing, are contemplated for the fabrication of the embodiments described above, other suitable manufacturing processes that allow the simultaneous formation of both conductive and insulating elements in an integrated manner are also contemplated.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A system for containing electronic circuitry therein, the system comprising:
   an outer enclosure, integrally formed from a conductive material and an insulating material;
   an antenna structure embedded within the outer enclosure and integrally formed from the conductive material in the outer enclosure;
   a counterpoise also embedded within the outer enclosure and integrally formed from the conductive material in the outer enclosure;
   a first port electrically connected with the antenna structure for providing electrical access to the antenna by the electronic circuitry contained within the system; and
   a second port electrically connected with the counterpoise for providing electrical access to the counterpoise by the electronic circuitry contained within the system,
   wherein the antenna structure and the counterpoise are not visible from outside the system.

2. The system of claim 1, wherein the conductive material includes at least one of a metal, carbon black, carbon nanotubes, graphene-polylactic acid composite, metal-based polymer composite, and graphene composition.

3. The system of claim 1, wherein the insulating material includes at least one of acrylonitrile butadiene styrene (ABS), thermoplastic polyurethane (TPU), plastic, fiber glass reinforcement material, wood fiber, and carbon fiber.

* * * * *